(12) United States Patent
Henderson et al.

(10) Patent No.: US 12,006,971 B2
(45) Date of Patent: Jun. 11, 2024

(54) BUSH ASSEMBLY

(71) Applicant: HC-ATM GROUP PTY LTD, Red Hill (AU)

(72) Inventors: Peter Henderson, Red Hill (AU); Murray Sydney Curti, Red Hill (AU)

(73) Assignee: HC-ATM GROUP PTY LTD, Red Hill (AU)

( * ) Notice: Subject to any disclaimer, the term of this patent is extended or adjusted under 35 U.S.C. 154(b) by 683 days.

(21) Appl. No.: 17/052,063

(22) PCT Filed: May 1, 2019

(86) PCT No.: PCT/AU2019/050394
§ 371 (c)(1),
(2) Date: Oct. 30, 2020

(87) PCT Pub. No.: WO2019/210361
PCT Pub. Date: Nov. 7, 2019

(65) Prior Publication Data
US 2021/0245563 A1 Aug. 12, 2021

(30) Foreign Application Priority Data
May 2, 2018 (AU) .................... 2018901484

(51) Int. Cl.
*F16C 11/06* (2006.01)
*F16C 11/08* (2006.01)
(52) U.S. Cl.
CPC .......... *F16C 11/08* (2013.01); *F16C 11/0614* (2013.01); *F16C 11/0638* (2013.01);
(Continued)
(58) Field of Classification Search
CPC .............. F16C 11/0614; F16C 11/0619; F16C 11/0623; F16C 11/0628; F16C 11/0633;
(Continued)

(56) References Cited

U.S. PATENT DOCUMENTS 1,894,309 A * 1/1933 Flumerfelt .......... F16C 11/0628
384/207
2,718,418 A * 9/1955 Latzen ................ F16C 11/0628
403/137
(Continued)

FOREIGN PATENT DOCUMENTS

DE 102007024925 A1 * 12/2007 .......... F16C 11/0614
DE 102007039858 A1 * 3/2008 .......... F16C 11/0614
(Continued)

OTHER PUBLICATIONS

PCT; App No. PCT/AU2019/050394; International Search Report and Written Opinion dated May 20, 2019.

*Primary Examiner* — Amber R Anderson
*Assistant Examiner* — Kevin J Baynes
(74) *Attorney, Agent, or Firm* — Fitch, Even, Tabin & Flannery LLP

(57) ABSTRACT

A bush assembly for use with jointed members in a motor vehicle, the bush assembly comprising: an outer housing; an inner member including a semi-spherical portion; and a bushing comprising a plurality of segments of resilient material disposed between the outer housing and the inner member, and defining a semi-spherical cavity for receiving the semi-spherical portion; the outer housing comprising a first housing section having a first engagement formation, and a second housing section having a second engagement formation, wherein said first and second engagement formations are adapted to be inter-engaged to secure said housing sections and retain the bushing and at least the semi-spherical portion of the inner member within the outer housing. A method for producing the bush assembly involving the pre-loading of the bushing, desirably composed of polyurethane, is also disclosed.

16 Claims, 6 Drawing Sheets

(52) U.S. Cl.
CPC . *B60G 2204/416* (2013.01); *Y10T 403/32737* (2015.01); *Y10T 403/32803* (2015.01)

(58) Field of Classification Search
CPC .............. F16C 11/0638; F16C 11/0642; F16C 11/0685; F16C 11/069; F16C 11/08; F16C 11/0661; F16C 11/083; Y10T 403/32786; Y10T 403/32795; Y10T 403/32803; Y10T 403/32721; Y10T 403/32737; B60G 2204/416
See application file for complete search history.

(56) References Cited

U.S. PATENT DOCUMENTS

| | | | | |
|---|---|---|---|---|
| 3,375,028 A * | 3/1968 | Patton | .................. | F16C 11/06 403/126 |
| 3,423,114 A * | 1/1969 | Gottschald | .......... | F16C 11/0671 403/138 |
| 3,537,737 A * | 11/1970 | Ortheil | .................. | B60G 7/005 403/140 |
| 3,722,931 A * | 3/1973 | Uchida | ............... | F16C 11/0619 280/93.508 |
| 4,440,186 A * | 4/1984 | Lottner | ................ | A61H 3/0288 135/84 |
| 4,712,940 A * | 12/1987 | Wood, Jr. | ............ | F16C 11/0628 403/133 |
| 4,714,369 A * | 12/1987 | Souza, Jr. | ............. | F16B 7/0446 403/297 |
| 5,230,580 A * | 7/1993 | Henkel | .................... | F16C 7/02 29/451 |
| 5,267,805 A * | 12/1993 | Ueno | .................... | F16C 11/069 403/132 |
| 5,372,373 A | 12/1994 | Reel | | |
| 5,564,853 A * | 10/1996 | Maughan | ............... | F16C 11/069 29/898.047 |
| 5,676,485 A * | 10/1997 | Lee | ...................... | F16C 11/069 403/50 |
| 5,813,789 A * | 9/1998 | Prickler | .............. | F16C 11/0638 403/135 |
| 5,904,436 A * | 5/1999 | Maughan | ............ | F16C 11/0647 403/135 |
| 5,931,597 A * | 8/1999 | Urbach | .................. | B60G 7/005 403/132 |
| 6,164,829 A * | 12/2000 | Wenzel | ............... | F16C 11/0638 403/135 |
| 6,164,861 A * | 12/2000 | Maughan | ............ | F16C 11/0638 403/135 |
| 6,325,544 B1 * | 12/2001 | Sasaki | ................. | F16C 11/0614 384/209 |
| 6,349,470 B1 * | 2/2002 | Sasaki | ................. | F16C 11/0614 384/208 |
| 6,505,990 B1 * | 1/2003 | Maughan | ............ | F16C 11/0638 403/135 |
| 7,661,902 B2 * | 2/2010 | Brunneke | ............. | F16C 33/122 403/143 |
| 8,256,980 B2 * | 9/2012 | Walter | ................ | F16C 11/0695 403/135 |
| 9,476,447 B2 * | 10/2016 | Schmidt | ................. | B60G 7/005 |
| 2003/0202841 A1 * | 10/2003 | Marunaka | ........... | F16C 11/0614 403/128 |
| 2009/0060633 A1 * | 3/2009 | Broker | ................ | F16C 11/0614 403/2 |

FOREIGN PATENT DOCUMENTS

| | | | | |
|---|---|---|---|---|
| EP | 2199119 B1 | 4/2011 | | |
| EP | 1906045 B1 | 3/2015 | | |
| FR | 1256475 A * | 3/1961 | .............. | F16C 11/06 |
| FR | 1598105 A * | 6/1970 | .......... | F16C 11/0614 |
| FR | 2312687 A1 * | 12/1976 | ................ | F16D 3/76 |
| GB | 1485365 A * | 9/1977 | .......... | F16C 11/0623 |
| GB | 1570499 A * | 7/1980 | ............ | B23P 15/003 |
| KR | 20120098814 A * | 9/2012 | .......... | F16C 11/0614 |
| WO | 9308407 A1 | 4/1993 | | |
| WO | 9413967 A1 | 6/1994 | | |
| WO | WO-2007102416 A1 * | 9/2007 | .......... | F16C 11/0685 |

* cited by examiner

BUSH ASSEMBLY

CROSS-REFERENCE TO RELATED APPLICATIONS

This application is a U.S. national phase application of International Application No. PCT/AU2019/050394, filed May 1, 2019, which claims priority to Australian Application No. 2018901484, filed May 2, 2018.

TECHNICAL FIELD

The present invention is concerned with a bush assembly for motor vehicles, particularly although not exclusively to bush assemblies utilized in jointed members employed in steering or suspension systems for heavy vehicles, whether for on or off-road use. The improved bush assembly may find particular suitability as a torque arm bush or a spring eye bush assembly although the invention need not be limited to this particular type of use. The present invention is also concerned with a method of producing the bush assembly.

BACKGROUND

One application of a bush assembly is as part of a torque rod or arm. The arm has an outer housing at one end or at each end, as desired. A bushing is fitted into the housing. The bush assembly comprises resilient material extending about a central part. The central part may be a hollow cylinder (also called a sleeve), or a solid part such as a straddle mount, a taper pin, a centre ball or a combination of these parts. Bush assemblies have many other applications as well. Another application is as part of a spring eye bush, the eye being formed by a hollow cylinder for reception of a bolt or stud. A further application for bush assemblies is in tie rod ends of steering systems, also known as "ball joints".

Thus the term 'bush assembly" is meant to include an assembly comprising a central part (e.g. steel inner sleeve, straddle mount, taper pin, centre ball etc.), resilient material, and an outer housing which may be a smooth outer cylinder (such as for a spring eye bush), but which may also comprise part of a torque rod (e.g. the "eye" part of the torque rod), tie rod or the like. Put differently, the bush assembly may comprise a separate part (e.g. a spring eye bush) which can be fitted into a spring eye or other type of eye, rather than where the outer housing is part of a torque rod, tie rod stud or other member.

FIG. 1A illustrates PRIOR ART bush assembly 10, here in the form of a tie rod end that includes an outer housing 12, a tie rod stud 14 protruding from one side of the housing and an end cap 16 with grease nipple fitting 18 attached to an opposite side of the housing from the stud. Internal components of a similar bush assembly 10' are shown partially dis-assembled in FIG. 1B, which components include a nylon support ring 20 including grease conduits 22 for lubricating a ball end 15 of the stud 14', a biasing member in the form of a spiral spring 24 and end cap 16' which retains the internal components against a ball end of the stud 14'. The end cap is configured for press-fitting into the opposite side of outer housing 12' from the stud. A dust cover 26 is provided around the stud 14' and over an aperture in the body 12' through which an opposite, threaded end of the stud which carries nut 28 protrudes.

In order to properly lubricate the known bush assembly which employs metal-on-metal contact, a grease nipple and associated internal galleries are typically provided. Another disadvantage with the bush assembly is that the operational life of the bush assembly can be quite limited, especially when used in heavy transport vehicles or in off-road applications.

In situations where there is insufficient lubrication, a "hammer effect" has been detected in tie rod ends which can loosen the securing nut 28, shear security devices such as a split pin and/or cause the end cap 18 to be released from the housing, resulting in steering system failure.

Another disadvantage with alternative known bush assemblies, such as straddle pins, employing resilient material in the form of rubber-based compounds is the very expensive equipment required to manufacture the bush assembly and especially to inject the rubber-based compounds between the outer housing and an inner sleeve. An example of a bonded elastomeric rubber type bush is shown in the rod end isolator disclosed in EP 1096045 B1 to SKF USA, INC.

A further prior art bush assembly for use with a torque rod, stabilizing bar or steering arm is shown in International Publication No. WO 94/08407 A (Taylor). In FIG. 7 there is shown a bush assembly 110 including an inner attachment member 111 and a non-bonded, resilient bush consisting of two bush parts 112, 113 of ring configuration held within an internal "eye" 118 of outer housing or "rod end" 117 by a combination of washers 113, 114 and associated circlip 116 or flange 119. Applicant has found that, in heavy duty operational conditions such as may be encountered by off-road, mining, competition or military vehicles, the inner attachment member typically encounters rapid and repeated, large scale deflection relative to the housing 117. For example, the wheel travel in some off-road mining machinery is of the order of 0.5m, and off-road conditions often result in continuous loading of movable bush assemblies, even when vehicles are stationary. Such deflection often eventually results distortion or even breakage of the circlip retainers, thereby releasing inner member 111 from the housing. Such releases of inner members from bushing can result in suspension or steering failure, leading to loss of control that may be dangerous to vehicle occupants and/or oncoming traffic.

There would be an advantage if it were possible to manufacture a bush assembly which had a particular design to allow the bush assembly to be manufactured without needing conventional expensive equipment, and/or that was better suited to repair by replacement of wearable components rather than outright replacement. There would also be an advantage if the bush assembly had an increased lifespan when used with heavy machinery, such as semi-trailers and off-road vehicles for recreational, mining or military applications including in harsh operating environments. Furthermore, it would be desirable to obviate or at least minimize maintenance requirements such as repeated greasing and associated visual inspections.

Any references to methods, apparatus or documents of the prior art are not to be taken as constituting any evidence or admission that they formed, or form part of the common general knowledge in Australia or any other country.

It is an object of the present invention to provide a bush assembly for jointed members employed in motor vehicles that overcomes at least one of the above-mentioned disadvantages or provide a useful or commercial choice in the marketplace.

SUMMARY OF THE INVENTION

According to a first aspect of the present invention there is provided a bush assembly for use with jointed members in a motor vehicle, the bush assembly comprising:

an outer housing comprising a first housing section and a second housing section securable to the first housing section;

an inner member including a semi-spherical portion and at least one elongate portion protruding from the outer housing, the inner member being movable relative to the housing; and a bushing comprising resilient material formed of a plurality of segments and disposed between the outer housing and the inner member, and defining a semi-spherical cavity for receiving the semi-spherical portion of the inner member;

the first housing section having a first engagement formation, and the second housing section having a second engagement formation, wherein said first and second engagement formations are adapted to releasably secure the housing sections together to retain the bushing and the semi-spherical portion of the inner member within the outer housing.

The outer housing is preferably of hollow cylindrical configuration, including a cylindrical wall and an inwardly extending radial flange portion. Suitably, the radial flange portion defines an aperture through which the elongate portion of the inner member protrudes. The aperture may be circular or ovoid in shape to provide differing angular ranges of movement for the inner member. The first and/or second housing section/s may include at least a portion of the cylindrical wall integrated with the radial flange.

The inner member may comprise a stud having the semi-spherical portion at or at least adjacent one end thereof and wherein an opposite end protrudes from the housing. In an alternative form, the inner member may comprise a pin having a semi-spherical portion intermediate opposing protruding ends thereof. Suitably the semi-spherical portion is centrally disposed between a pair of protruding ends of the pin.

The bushing segments suitably each have a generally semi-cylindrical outer surface. In one form the bushing segments comprise a pair of cylindrical segments. In a further form the plurality of segments may be partitioned along both longitudinal and radial planes. If required, the bushing parts may be slightly spaced from one another when assembled around the semi-spherical portion to allow for relative movement without significant rubbing or chafing.

Preferably, the engagement formations suitably include a plurality of surface protrusions and/or surface depressions, and may comprise complementary screw-threads or snap fitting formations. If required, the engagement formations may comprise chamfered protrusions or nose portions and/or depressions in the form of circumferential recess or channel portions arranged for forced or snap fitting. If required, the engagement formations are arranged to exert a predetermined pre-loading of the bushing segments during securing of the outer housing sections.

According to a second aspect of the present invention, there is provided a method of producing a bush assembly for use with jointed members in a motor vehicle, the method comprising the steps of:

providing an outer housing comprising first and second housing sections having complementary engagement formations;

providing an inner member having a semi-spherical portion for retention within the outer housing and an elongate portion protruding from the outer housing;

providing a bushing comprising resilient material preformed in a plurality of segments that define a semi-spherical cavity for reception of said semi-spherical portion of the inner member;

assembling the segments of the bushing around the semi-spherical portion of the inner member; and installing the bushing and inner member sub-assembly into a housing section; and securing together the first and second housing sections by inter-engagement of the respective engagement formations to thereby releasably retain the bushing and at least the semi-spherical portion of the inner member within the outer housing.

Suitably, the complementary engagement formations include a plurality of surface protrusions and/or surface depressions on each housing section, suitably arranged alternately and comprising screw-threads or snap-fitting formations; and/or the securing step involves application of a pre-determined axial loading to end faces of the bushing segments.

Most suitably, the resilient material of the bushing segments includes polyurethane plastics material.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way.

The Detailed Description will make reference to a number of drawings as follows.

DETAILED DESCRIPTION OF PREFERRED EMBODIMENTS

Figure 1A:
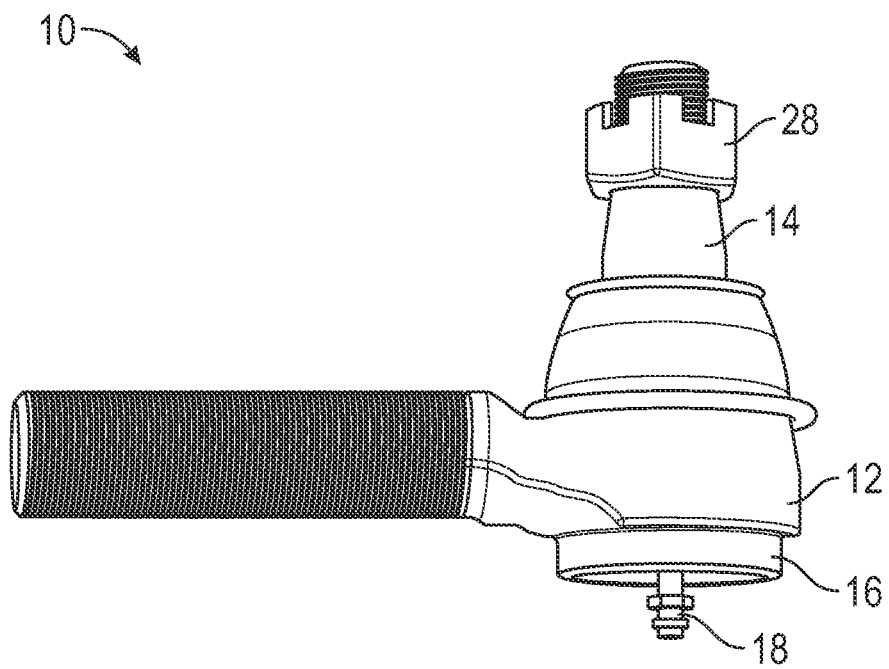
FIG. 1A is a side view of a bush assembly of the prior art.
Figure 1B:
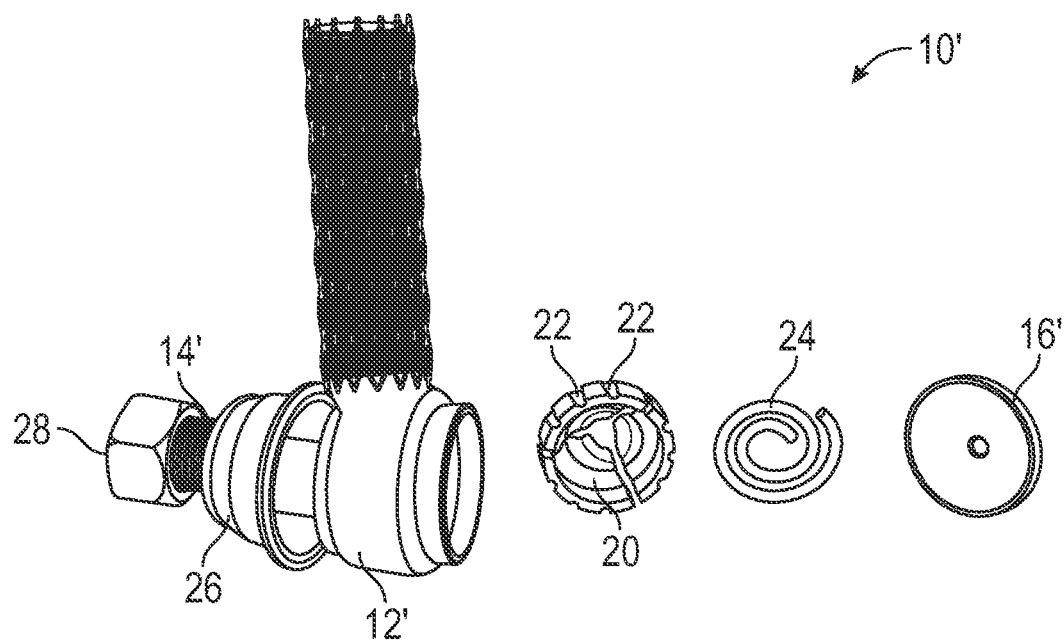
FIG. 1B is an exploded view of a bush assembly of the prior art.

Referring first to FIGS. 2-4 and 8, there is depicted a bush assembly of a first embodiment of the present invention, being for use with jointed members in a motor vehicle. The bush assembly here is in a form for inclusion in a tie rod assembly 100 for use in heavy vehicle steering gear. The tie rod assembly includes a tie rod main body 110 having an elongate, externally threaded stem portion 112 and an outer, hollow housing portion 114, which portions are suitably integrally formed in the main body. Stem portion 112 of the main body includes a longitudinal axis labelled A-A in FIG. 2. As best appreciated from the sectional views in FIGS. 7-8, the outer housing portion 114 includes a cylindrical wall 116 defining an internal cavity, the wall having an outside radius a, which in a particular application may be 35 mm. The hollow housing portion 114 further includes, at one end, an inwardly extending radial flange portion 118 defining an aperture.

Figure 5:
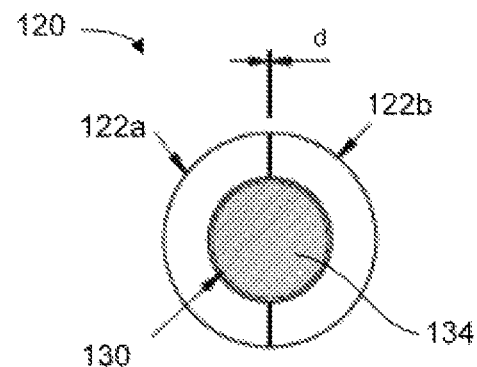
FIG. 5 is a partial sectional top plan view of bushing components surrounding a body portion of the tie rod stud of the embodiment of FIG. 4, taken along line B-B.

The tie rod assembly 100 further includes a bushing component 120 in the form of a resilient material, desirably of plastics including polyurethane, provided in a plurality of parts. Here the bushing is in the form of two semi-cylindrical bushing segments 122a, 122b (collectively "122") having clearance space d of approximately 1 mm, as best seen in FIG. 5. An interior surface of the bushing component 120 defines a semi-spherical cavity 124. The bushing segments 122 are provided regularly on radials and, when assembled together in use as (depicted in FIG. 7), disposed within the hollow housing portion 114.

The segments are configured with an internal surface to together substantially surround a semi-spherical or ball end portion 132 of a moveable inner member of the tie rod assembly, here in the form of a tie rod stud 130. Note that the term "semi-spherical" is here intended to encompass partial or incomplete spherical shapes, rather than only hemispheres.

Figure 2:
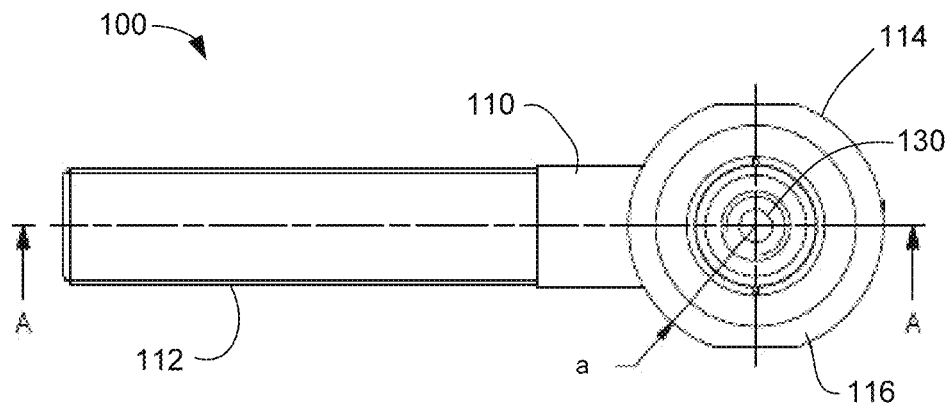
FIG. 2 is a top plan view of a bush assembly of a first, preferred embodiment of the invention, used with jointed members in the form of a tie rod assembly 100.
Figure 3:
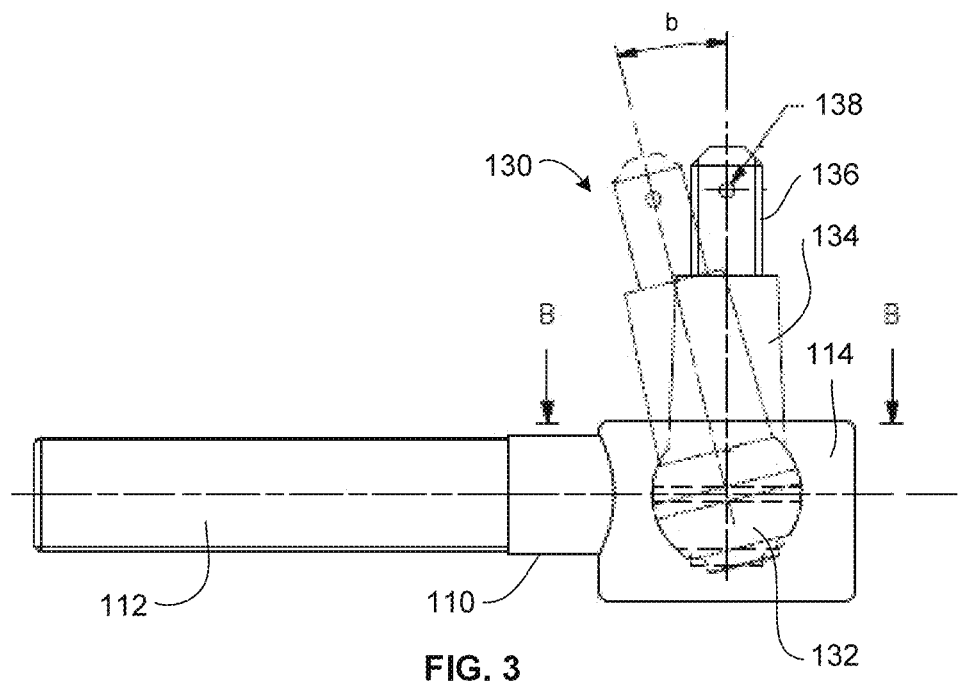
FIG. 3 is a side elevational view of the tie rod joint of the embodiment shown in FIG. 2, showing (in phantom) movement range of a movable member in the form of a tie rod stud 130.
Figure 4:
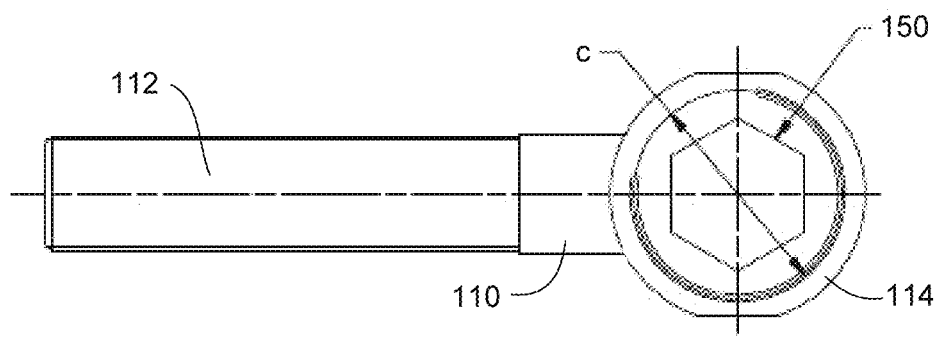
FIG. 4 is a bottom plan view of the tie rod joint of the embodiment of FIGS. 2-3.

The end portion 132 of the tie rod stud is held captive in the outer housing, whilst an opposite end of the stud protrudes outwardly through the aperture defined by the radial flange 118 of the housing 114. The aperture defined by the flange portion 118 which is here circular, which also may be of other selected shapes such as ovoid, allows an angular range of movement b of the tie rod stud from a neutral position, as depicted in FIG. 2. The angular range of movement b is here 14°, but an ovoid aperture may allow up to 27° in a second dimension, if required.

Figure 6:
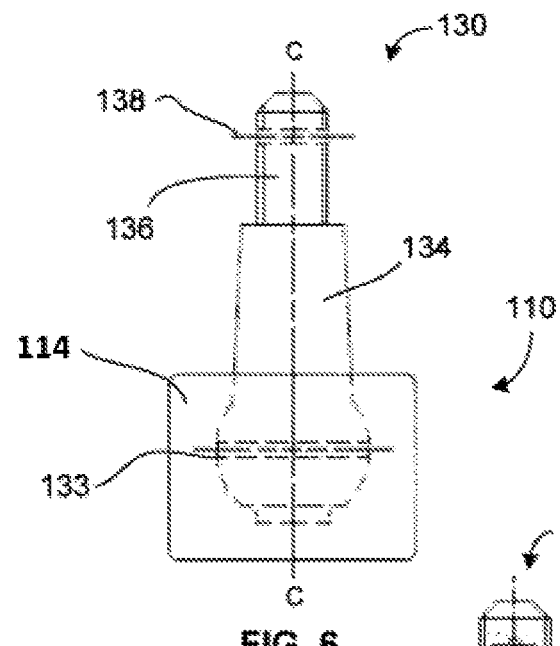
FIG. 6 is an end view of the tie rod assembly of the embodiment depicted in FIGS. 2-3, including hidden detail of the tie rod stud and axis C-C.
Figure 7:
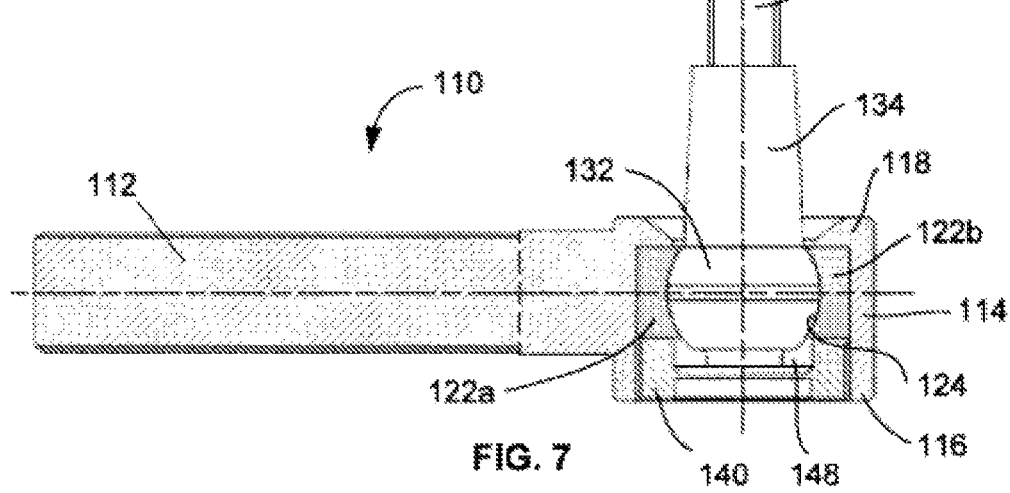
FIG. 7 is partial sectional side elevational view of the tie rod joint of the embodiment of FIG. 2, taken along line A-A.
Figure 8:
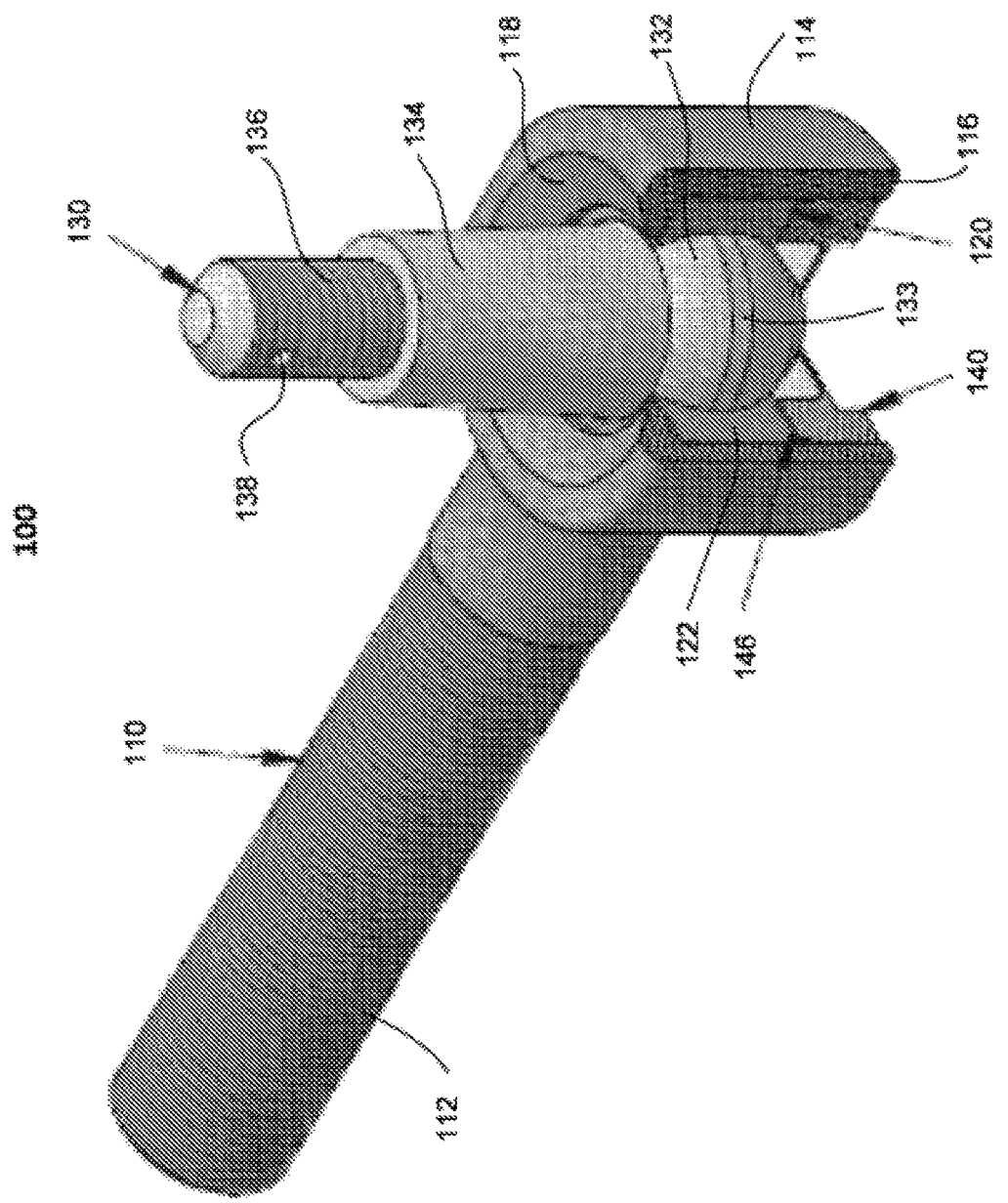
FIG. 8 is a partial sectional top isometric view of the tie rod joint 100 of the embodiment as shown in FIGS. 2-3, 6 and 7.

The tie rod stud 130 further includes a tapered body 134 with an attachment portion 136 at the end opposite to the semi-spherical end portion 132. The attachment portion 136 of the stud here includes an external screw thread with transverse aperture 138 for receiving a nut locking device (not shown) such as a split pin, spring clip or the like. The tie rod stud 130 of the embodiment is generally elongate and includes a longitudinal axis C-C (see FIG. 6) that is normal to axis A-A of the tie rod body 110 when the tie rod assembly 100 is in the neutral position, as depicted in FIG. 7.

The semi-spherical end portion 132 of stud 130 may further include a flattened land portion 133 machined into a circumference thereof, for example where intersected by the rod axis A-A, when in the neutral position. Applicant believes that, in some applications, the land 133 assists in providing a self-centering action to the moveable inner member 130, although otherwise angularly moveable in two (2) dimensions. A bushing component including spaced annular parts (as discussed below in the second embodiment) may more effectively facilitate self-centering.

Figure 9:
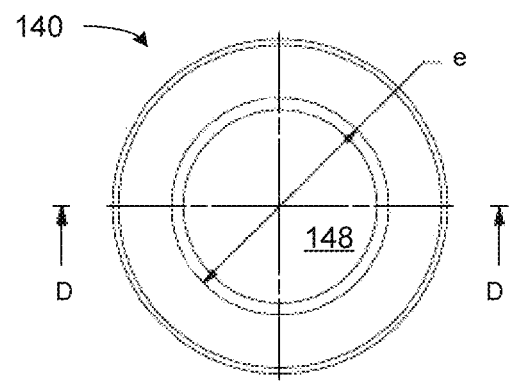
FIG. 9 is a top plan view of an end cap component of the embodiment depicted in FIGS. 4 and 7, in the form of a tie rod retainer 140.
Figure 10:
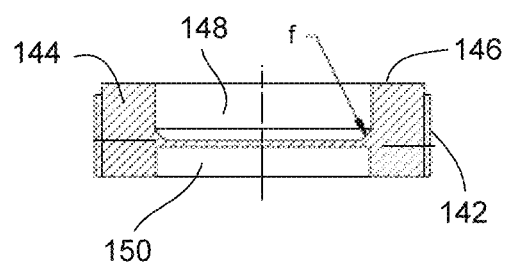
FIG. 10 is a sectional view of the tie rod retainer of FIG. 9, taken along line D-D.
Figure 11:
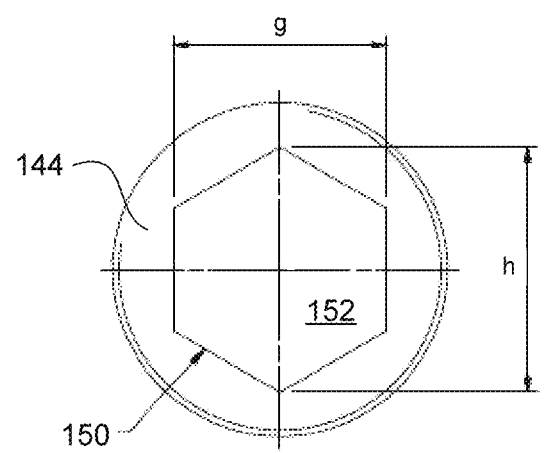
FIG. 11 is a bottom plan view of the tie rod retainer of FIGS. 9 and 10.

A removable retainer or housing section 140, here in the form of an externally threaded end cap, retains the bushing 120 and semi-spherical end portion 132 of the tie rod stud 130 within the housing 114. Referring to FIGS. 9 to 11, the retainer includes an outer circumferential engagement formation 142, here a screw-thread provided on an external surface of a substantially annular retainer body 144. The retainer 140, of average outer diameter c of about 55 mm, is thereby engageable with a complementary formation provided on the housing portion 114, in the present embodiment on an inner surface of the hollow housing (see FIGS. 4 and 7-8).

The retainer body 144 further includes a washer or ring-shaped abutment portion 146 on one face (see FIG. 9) and a hexagonal socket portion 150 on an opposite face (see FIG. 11). The ring-shaped abutment portion 146 is arranged to abut end faces of the bearing segments 122 thereby supporting same. A recess 148 in the body 144 is provided within the abutment ring to allow clearance for movement of the semi-spherical end portion 132 of the tie rod stud 130. The clearance recess 148 has an internal diameter e, here of 37 mm, and a stress-relieving chamfered internal corner f.

The socket portion 150 on an opposite side of the bearing retainer 140 also includes a further recess 152, here adapted to receive a hexagonal tool (not shown), having a flat-to-flat dimension g (e.g. 36 mm) and an apex-to-apex dimension h (e.g. 42 mm). The hexagonal tool may be employed during assembly of the tie rod assembly to exert a predetermined axial load or compression on end faces of the bearing segments 122, as required.

Figure 12:
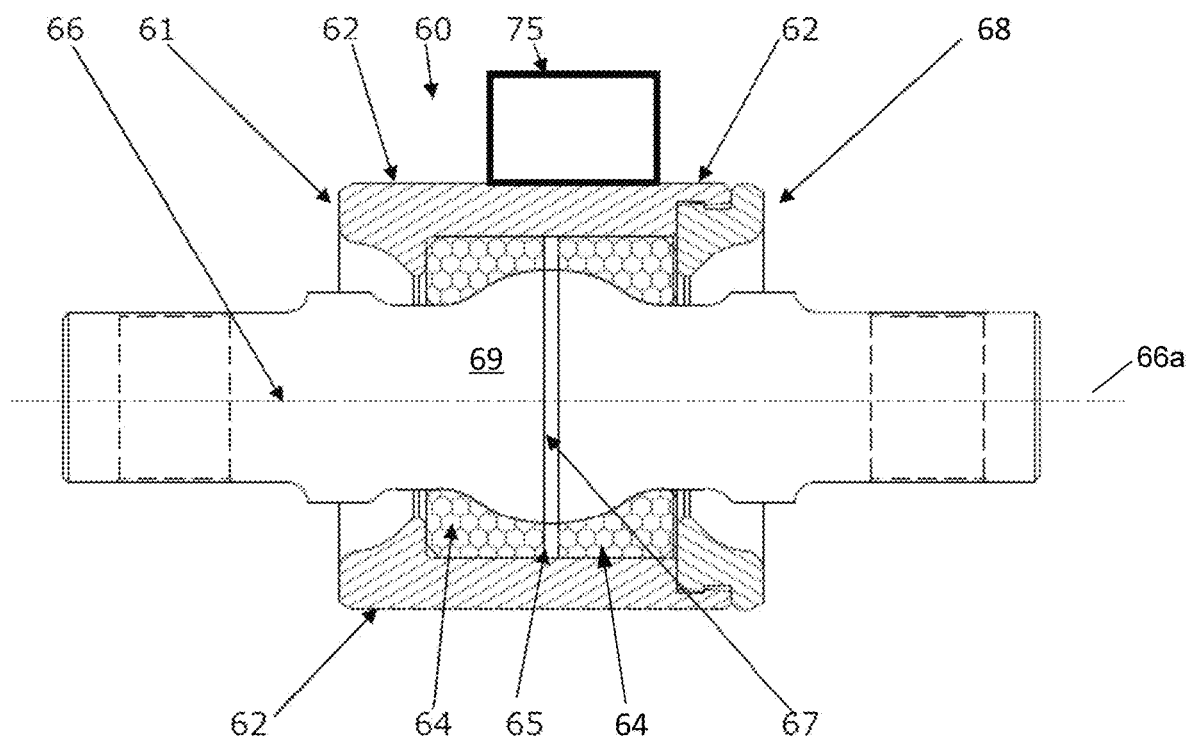
FIG. 12 is a sectional side elevational view of a bus assembly of a second embodiment of the present invention.
Figure 13:
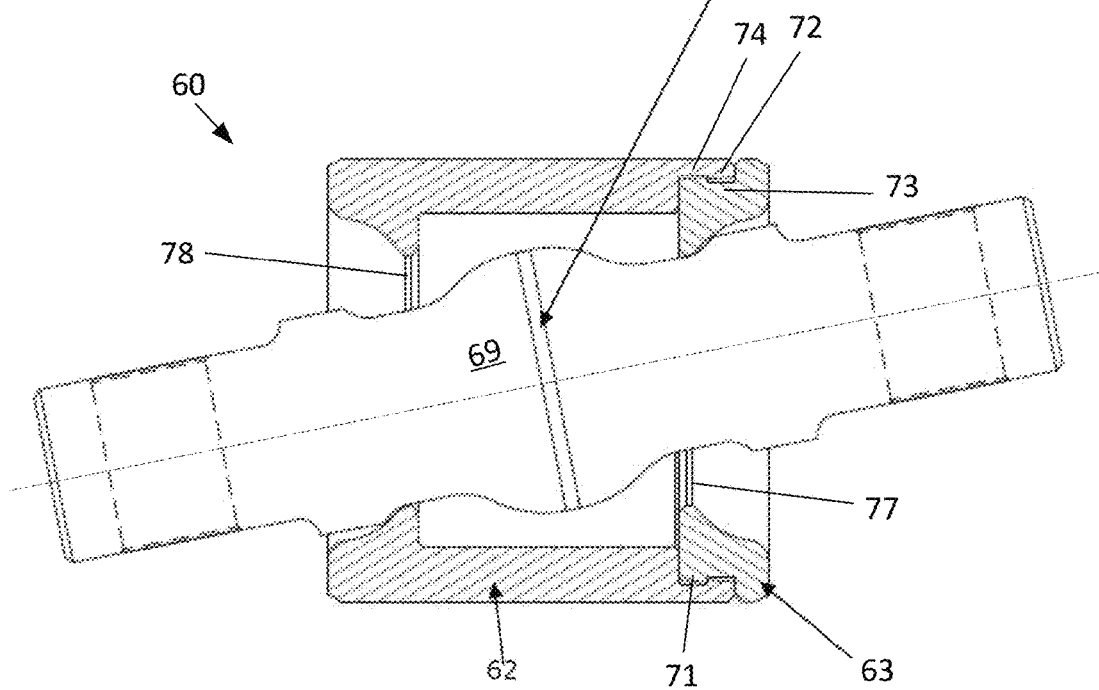
FIG. 13 is a further sectional side elevational view of the bush assembly of FIG. 12.

FIGS. 12 and 13 illustrate a bush assembly 60 of another embodiment of the invention. In this particular embodiment, the outer housing 61 again comprises two sections removable from one another—with one section being much larger than the other section. However, it will be appreciated that the sections could alternatively be of equal size. Specifically, the larger housing section 62 of the present embodiment comprises one end and substantially an entire side wall of the outer housing of the bush assembly 60. The smaller housing section 63 can be seen as a removable retainer or end cap, which is provided with an aperture 77 in this embodiment.

The large section 62 and the smaller section 63 snap fit together in a frictional, force-fitted engagement. Each housing section 62, 63 includes an engagement formation which engage or lock together when the sections are forced together in order to assemble the bush assembly illustrated in FIG. 13. In the particular embodiment, the engagement formation on each housing section includes complementary protrusions and depressions. The protrusions here each comprise a "male" or nose portion 71, 72 behind which are depressions, here each comprise circumferential "female" or recess portion 73, 74 (respectively). When the housing sections 62, 63 are forced together, the nose portion of one section moves into the recess portion of the other section and vice versa. This area can be called the deformation or "snap" zone 68.

The male housing portions 71, 72 have a relatively thicker cross section to reduce the deformation inward. The female housing portions 73, 74 have a relatively thinner cross section resulting in most of the deformation accruing outwardly. Thus the deformation area relaxes back in after the housing portions inter-engage. Lead chamfers are provided to assist in the snap locking action. An initial gap is provided to promote ease of alignment.

A rod or arm or similar member 75 can be welded or otherwise attached to the outer side wall 62 without conflicting with the joint provided between other parts. This particular bush assembly can contain the internal resilient material, here in substantially annular parts 64, which can be provided with a small gap 65 in the manner described previously.

The inner member, here a transverse pin 66 having a longitudinal axis 66a comprises a central ball portion 69 and a pair of protruding elongate portions with respective mounting holes, The central ball portion 69 includes a flattened land portion 67 to facilitate working of the bush assembly 60. An internal surface of the annular bushing parts 64 is semi-spherical in order to movably accommodate the ball portion 69. The possible range of movement by opposed ends of the pin member 66 is depicted in FIG. 13, which ends protrude from apertures 77, 78 provided in the smaller housing section or end cap 63 and the larger housing section 62, respectively. It will be appreciated that the annular bushing parts 64 may be substituted with bush segments wherein the segments extend along the body of the pin being partitioned on longitudinal planes, as described in relation to the first embodiment of the invention.

In use, the bushing assembly provides a reliable, low maintenance joint between members that typically is restrained in a first axis of movement and freely movable over a predetermined angular range in one or both of two remaining (typical orthogonal) axes, facilitated by the semi-spherical geometry of mating surfaces of the inner member and bushing component, and also the housing aperture size. In a preferred embodiment, the screw threaded engagement formations allow predetermined loading of a segmented bushing component, desirably composed of polyurethane plastics material.

In terms of manufacture, the bushing assembly may be fabricated by forming a hollow outer housing suitably including a cylindrical internal bore conveniently defined by a first section having a cylindrical wall and inwardly extending radial flange, and a second housing section or end cap. The housing sections are provided with engagement formations, such as complementary screw threads or force-fit male and female formations, on opposed surfaces thereof for ease of assembly and disassembly. The radial flange suitably defines an aperture in an end wall of the outer housing, and a similar aperture may be provided in the second housing section or end cap, as desired. The housing may be composed of a high strength, low alloy (HSLA) steel, aluminum alloys or like material and be integral with or attached to, such as by welding, other members to be jointed.

An inner member, preferably also composed of HSLA steel, for movable mounting relative to the outer housing can be formed with a semi-spherical or "ball" portion either at an end, such as in the case of a stud, or formed intermediate opposed ends in the case of a pin with mounting points at said opposed ends.

The bushing component is preferably provided from a plurality of segments composed of a resilient plastics material including polyurethane pre-formed by casting. The plastics material suitably has a hardness in the range of 45 to 110, most suitably in the range of 75 to 95, on the Durometer scale; selected depending on the application and desired impact absorption. A semi-spherical cavity is formed within the bushing component to receive the ball portion of the inner member. When assembled around the ball, the inner member and surrounding bushing can be inserted into the hollow outer housing. The bushing parts may be of substantially annular configuration (as depicted for example in FIGS. 12-13) or, more preferably of segmented configuration (as depicted in FIGS. 5-8). The segmented bushing parts are believed to be more resistant to forces applied axially to the bushing component by the inner stud or pin member, which tend to "extrude" the bushing component parts out of the aperture in an end wall or cap.

After insertion, the second housing section or end cap can be secured to the main housing section by securing the complementary engagements together. If required, a close tolerance can be provided between the aperture and the semi-spherical surface of the ball portion of the inner member, which assists in excluding direct and debris from the bushing. A predetermined axial load can optionally be applied by an internal washer integrated into the end cap, by torqueing the end cap as required, using a hexagonal or like tool applied to the further recess on an external surface of the end cap (see FIGS. 4 and 10-11).

The bushing assembly of the embodiment eschews the requirement for external periodic, application of lubricant, typically providing a 5 to 7 year life in normal use. The releaseable screw-threaded end cap closure provides for repair in the event that a visual inspection indicates degradation or imminent failure of a part of the bushing assembly.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect. For example, the steering tie rod assembly of the embodiment is but one example of a bush assembly suited to use with jointed members in a motor vehicle. The invention is, therefore, claimed in any of its forms or modifications within the proper scope of the appended claims appropriately interpreted by those skilled in the art.

LIST OF REFERENCE SYMBOLS

| | |
|---|---|
| 10, 10' | tie rod end |
| 12, 12' | tie rod outer housing |
| 14, 14' | tie rod stud |
| 15 | stud ball end |
| 16 | end cap |
| 18 | grease nipple fitting |
| 20 | support ring |
| 22 | grease conduits |
| 24 | spiral spring |
| 26 | dust cover |
| 60 | bush assembly |
| 61 | outer housing |
| 62 | larger housing section |
| 63 | smaller housing section |
| 64 | bushing component |
| 65 | bushing gap |
| 66 | inner pin member |
| 66a | pin axis |
| 67 | flattened land portion |
| 68 | snap zone |
| 69 | ball portion |
| 71 | engagement nose portion |
| 72 | engagement nose portion |
| 73 | engagement recess |
| 74 | engagement recess |
| 75 | rod/arm member |
| 77 | smaller housing aperture |
| 78 | larger housing aperture |

-continued

| LIST OF REFERENCE SYMBOLS | |
|---|---|
| 100 | tie rod assembly |
| 110 | tie rod main body |
| 112 | threaded stem portion |
| 114 | outer housing portion |
| 116 | cylindrical wall |
| 118 | radial flange portion |
| 120 | bushing component |
| 122a | first bushing segment |
| 122b | second bushing segment |
| 124 | semi-spherical cavity |
| 126 | not used |
| 128 | not used |
| 130 | tie rod stud |
| 132 | semi-spherical end portion |
| 133 | flattened land portion |
| 134 | tapered stud body |
| 136 | attachment portion |
| 138 | transverse aperture |
| 140 | retainer/housing section |
| 142 | engagement formation |
| 144 | retainer body |
| 146 | abutment portion |
| 148 | clearance recess |
| 150 | socket portion |
| 152 | further recess |

The invention claimed is:

1. A bush assembly for use with jointed members in a motor vehicle, the bush assembly comprising:
an outer housing comprising a first housing section and a second housing section securable to the first housing section;
an inner member including a semi-spherical portion, a first elongate portion protruding from the outer housing, and a second elongate portion extending from the semi-spherical portion in a direction opposite the first elongate portion, the inner member being movable relative to the housing;
a bushing comprising resilient material formed of a plurality of segments and disposed between the outer housing and the inner member, and defining a semi-spherical cavity for receiving the semi-spherical portion of the inner member; the first housing section having a first engagement formation, and the second housing section having a second engagement formation,
wherein said first and second engagement formations are adapted to releasably secure the housing sections together to retain the bushing and the semi-spherical portion of the inner member within the outer housing,
wherein the bushing has a cylindrical outer surface and the bushing segments are entirely partitioned along a longitudinal plane of the cylindrical outer surface that extends a long a central longitudinal axis of the inner member; and
wherein the second elongate portion of the inner member extends beyond end surfaces of the bushing segments that abut the second housing section.

2. The bush assembly according to claim 1 wherein the engagement formations on the housing sections include a plurality of surface protrusions and/or cooperating surface depressions on each housing section for resisting lateral loading.

3. The bush assembly according to claim 2 wherein the engagement formations comprise complementary screw-threads.

4. The bush assembly according to claim 2 wherein the engagement formations comprise snap-fitting nose portions and circumferential recesses.

5. The bush assembly according to claim 2 wherein the engagement formations are arranged to exert a pre-determined pre-loading of the bushing segments during securement of the housing sections.

6. The bush assembly according to claim 1 wherein the outer housing is of hollow cylindrical configuration, including a cylindrical wall and an inwardly extending radial flange portion.

7. The bush assembly according to claim 6 wherein the radial flange portion defines an aperture through which the first elongate portion of the inner member protrudes.

8. The bush assembly according to claim 7 wherein the aperture is ovoid in shape to provide differing angular ranges of movement for the inner member.

9. The bush assembly according to claim 1 wherein the second elongate portion of the inner member does not extend beyond the second housing section outside of the outer housing.

10. The bush assembly according to claim 1 wherein the second elongate portion of the inner member does extend beyond the second housing section and outside the outer housing.

11. The bush assembly according to claim 1 wherein the resilient material of the bushing segments includes polyurethane plastics material.

12. A method of producing a bush assembly for use with jointed members in a motor vehicle, the method comprising the steps of:
providing an outer housing comprising first and second housing sections having complementary engagement formations for securing the housing sections together;
providing an inner member having a semi-spherical portion for retention within the outer housing, a first elongate portion, and a second elongate portion extending from the semi-spherical portion in a direction opposite the first elongate portion;
providing a bushing comprising resilient material in a plurality of segments that together define a semi-spherical cavity for reception of said semi-spherical portion of the inner member;
assembling said plurality of segments of the bushing around the semi-spherical portion of the inner member;
installing the assembled bushing segments and inner member into either the first or second housing section;
securing together the first and second housing sections by inter-engagement of the engagement formations to thereby releasably retain the bushing and the semi-spherical portion of the inner member within the outer housing,
wherein the bushing has a cylindrical outer surface and the bushing segments are entirely partitioned along a longitudinal plane of the cylindrical outer surface that extends along a central longitudinal axis of the inner member; and
wherein the second elongate portion of the inner member extends beyond end surfaces of the bushing segments that abut the second housing section.

13. The method according to claim 12 wherein the step of providing the outer housing involves the provision of complementary engagement formations including a plurality of surface protrusions and/or cooperating surface depressions on each said housing section.

14. The method according to claim 13 wherein the provision of complementary engagement formations involves the provision of screw threads on the housing sections.

15. The method according to claim 13 wherein the provision of complementary engagement formations involves the provision of snap-fitting nose portions and circumferential recesses on the housing sections.

16. The method according to claim 12 wherein the securing step further includes application of a pre-determined axial loading to end faces of the bushing segments.

* * * * *